July 2, 1963  B. C. WEBER ET AL  3,096,187
SILICON-BORON-OXYGEN REFRACTORY MATERIAL
Filed Aug. 5, 1959
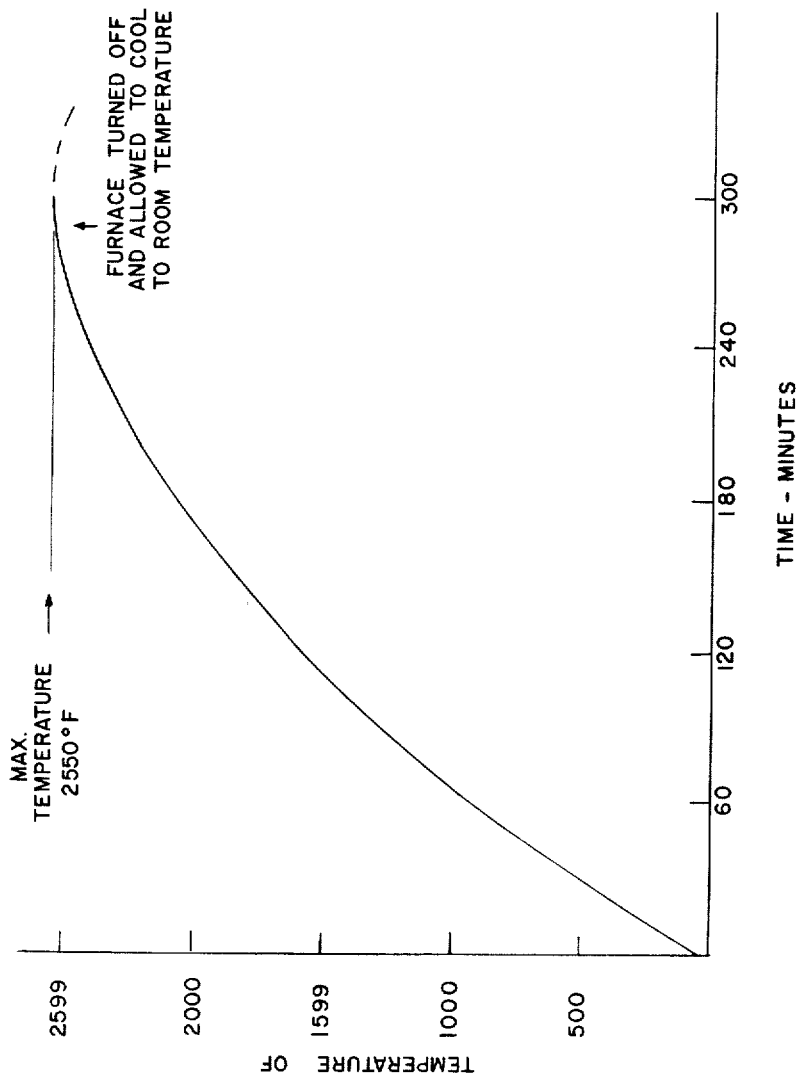
INVENTORS
BERTHOLD C. WEBER
HARRY F. RIZZO
BY
ATTORNEYS United States Patent Office 3,096,187
Patented July 2, 1963

3,096,187
SILICON-BORON-OXYGEN REFRACTORY MATERIAL
Berthold C. Weber and Harry F. Rizzo, Dayton, Ohio, assignors to the United States of America as represented by the Secretary of the Air Force
Filed Aug. 5, 1959, Ser. No. 831,919
13 Claims. (Cl. 106—55)
(Granted under Title 35, U.S. Code (1952), sec. 266)

The invention described herein may be manufactured and use by or for the Government for governmental purposes without the payment to us of any royalty thereon.

This invention relates to a refractory material containing silicon, boron and oxygen and to a method for its preparation.

A brief summary of the invention follows indicating its nature and substance together with a statement of the objects of the invention commensurate and consistent with the invention as claimed and also setting out the exact nature, the operation and the essence of the invention complete with proportions and techniques that are necessary with its use. The purpose of the invention also is stipulated. The presentation is adequate for any person who is skilled in the art and science to which the invention pertains to use it without involving extensive experimentation. The best mode of carrying out the invention is presented by the citing of specific operative examples inclusive of the preparation and the potential practical application of the invention.

The present invention relates to a silicon-boron-oxygen refractory material which exhibits unusual properties as a high temperature material and to methods disclosed herein for making the same.

The invention is based on the discovery that shaped bodies or articles of manufacture comprising an intimate mixture of elemental silicon and boron powders when sintered in air result in a refractory product with a combination of properties not to be found in compositions previously available.

A characteristic of the silicon-boron-oxygen composition as described herein is the fact that the fired product consists of three phases, each of which imparts special favorable properties to the end product. The three phases have been determined as a borosilicate matrix phase in which are dispersed both unreacted silicon and silicon-boron-reaction phase. The silicon-boron reaction phase is an intermetallic type composition, the stoichiometry of which is not yet established, and, which may be expressed by the formula $Si_mB_n$ wherein the subscripts $m$ and $n$ are limited general numbers that are small integers such as 1, 2, 3, etc.

It is an object of the present invention to provide an improved material with an unexpected new and useful combination of properties such as light weight, oxidation resistance at high temperatures, and thermal shock resistance in addition to high refractoriness for use in missiles and aircraft to resist the effect of aerodynamic heating and the like.

A further object of this invention is to provide a refractory material that resists the chemical reaction of highly corrosive media, such as superheated boron oxide or boron oxide-boron reaction products, for specific use as a container material, or for protective coatings in combustion chambers required by the armed services.

Another object is to provide a light weight refractory resistant to oxidation at elevated temperatures up to 3000° F. which, due to its boron content, is useful for the fabrication of control rods and as shielding material in nuclear reactors.

A unique characteristic of the boron-silicon-oxygen refractory materials that are disclosed herein is the fact that they also exhibit an unexpected low electrical resistivity. This is a feature of importance in possible applications as resistor heating elements or as a susceptor in a high frequency field usable in an oxidizing atmosphere up to 3000° F.

It is a further object to provide a range of compositions and practical methods for fabricating shapes of the boron-silicon-oxygen refractories described herein.

The method of preparing the boron-silicon-oxygen material that is contemplated hereby is the forming by dry pressing or slip casting and the sintering in air of a powder mixture of about from 5 to 50 weight percent boron and a difference of 95 to 50 weight percent silicon.

The batch composition is prepared using boron and silicon powders of a preferred size to pass screens of from 150 to 325 mesh, by dry mixing the powders. The powder materials may if preferred, be wet mixed in a ball mill with methanol or the like as the vehicle and then dried.

The forming of the mixed powders may be accomplished by dry pressing in steel dies using pressures of about from 9000 to 25000 p.s.i. No binder is required for this procedure, except for compositions of low boron content, the pressing properties of which are improved by adding 1 cc. of distilled water to each 100 grams of dry mixed powders.

The powder mix may also be slip cast and then sintered. In the preparation of the casting slip the mixed powders are suspended in a suitable dilute mineral acid such as a hydrochloric-water solution of 1 normal HCl concentration using ½ to 1 cc. of 1 N HCl for each gram of the dry powder mixture, depending on the particle size of the powders, to make a slurry of a desired consistency. The HCl stabilizes the suspension and prevents settling.

The slurry so made is poured into a plaster of Paris mold. For thin-walled hollow shapes the excess slurry is poured out of the mold after a desired wall thickness has built up in the mold cavity.

For solid shapes a thick slurry is prepared and is fed into the mold until the mold cavity is completely filled. There is adequate dry shrinkage of the solid or hollow cast material to accomplish the easy release of the shapes the molds.

The green specimens that result from pressing or slip casting are dried at 100° C. to remove any moisture content before they are sintered in air atmosphere using an electric furnace equipped with silicon carbide heating elements or the like. Compositions from 20 to 50 weight percent boron and between 80 to 50 weight percent silicon can be sintered or densified at temperatures of 2550° F. up to 2700° F. Compositions of between 5 and 20 weight percent boron and between 95 and 80 weight percent silicon must be fired at a temperature of about 2525° F. to avoid the sweating out of silicon. The total firing time may be varied from one hour to 6 hours.

The accompanying single FIGURE drawing illustrates the time temperature relationship for the normal sintering cycle in terms of degrees Farenheit temperature versus minutes of time. As illustrated in the figure, upon arriving at the maximum sintering temperature the furnace is turned off.

The normal firing schedule, as shown in the curve of the drawing, is 5 hours from room temperature up to 2550° F. The sintering results, such as weight gain, bulk density, and shrinkage, for various compositions of elemental silicon and boron after one sintering operation are presented in the following table:

TABLE I
*Sintering Results*

| Initial Composition Before Sintering (Percent by Weight) | Method of Forming | Sintering Temperature, °F. | | |
|---|---|---|---|---|
| | | 2,525 | | |
| | | A | B | C |
| 95 Si+5 B [1] | Pressed | 27.7 | 2.28 | 4.95 |
| 95 Si+5 B [2] | do | 27.4 | 2.23 | 4.49 |
| 95 Si+5 B [1] | Slip Cast | 34.9 | | 4.70 |
| 95 Si+5 B [3] | Pressed | 27.7 | 2.26 | 4.96 |
| 90 Si+10 B [1] | do | 27.5 | 2.23 | 4.40 |
| 90 Si+10 B [2] | do | 29.3 | 2.17 | 3.70 |
| 90 Si+10 B [1] | Slip Cast | 41.3 | | 11.80 |
| 85 Si+15 B [1] | Pressed | 22.4 | 2.14 | 3.50 |
| 80 Si+20 B [3] | do | 23.9 | 2.06 | 3.90 |
| 80 Si+20 B [2] | do | 23.9 | 2.08 | 3.75 |
| 80 Si+20 B [1] | Slip Cast | 43.8 | | 9.51 |
| 80 Si+20 B [1] | Pressed | 24.1 | 2.07 | 3.60 |

| | | 2,550 | | | 2,600 | | |
|---|---|---|---|---|---|---|---|
| | | A | B | C | A | B | C |
| 65 Si+35 B [1] | do | 19.6 | 1.86 | 1.99 | 20.2 | 1.84 | 2.05 |
| 65 Si+35 B [2] | do | 24.8 | 2.09 | 3.85 | 24.1 | 2.07 | 3.69 |
| 65 Si+35 B [1] | Slip Cast | 41.3 | | 5.90 | 40.3 | | 6.38 |

| | | 2,650 | | | 2,700 | | |
|---|---|---|---|---|---|---|---|
| | | A | B | C | A | B | C |
| 65 Si+35 B [1] | Pressed | 23.25 | 1.92 | 2.72 | 19.8 | 1.93 | 2.67 |
| 65 Si+35 B [2] | do | 24.97 | 2.23 | 4.83 | 24.1 | 2.17 | 4.94 |
| 65 Si+35 B [1] | Slip Cast | 41.7 | | 8.03 | 43.1 | | 7.64 |

| | | 2,550 | | |
|---|---|---|---|---|
| | | A | B | C |
| 60 Si+40 B [1] | Pressed | 18.7 | 1.81 | 1.56 |
| 50 Si+50 B [1] | do | 22.0 | 1.67 | 0.55 |
| 50 Si+50 B [2] | do | 25.2 | 1.93 | 1.62 |
| 50 Si+50 B [1] | Slip Cast | 57.1 | | 4.10 |
| 40 Si+60 B [1] | Pressed | 24.0 | 1.78 | .40 |
| 40 Si+60 B [2] | do | 25.9 | 1.90 | 1.0 |
| 40 Si+60 B [1] | Slip Cast | 68.1 | | 2.90 |

The superscripts to B in the above chart refer to boron derived from different sources and the different borons may be described as:

(1) Boron that contains from 95 to 97 weight percent amorphous boron;

(2) Boron that contains 99.2 weight percent crystalline boron; and (3) Boron that contains from 95 to 97 weight percent amorphous boron.

A. Percent wt. gain upon sintering which weight, gain after sintering at the temperature of 2525° F. can only be the absorption of oxygen from the surrounding air and which absorption of oxygen from the air, as determined experimentally and recorded in the above data, is over a range by weight gain of from 19.6% for the sintered powder mixture of 65% Si plus 35% B, to a high oxygen weight gain of 43.8% for the sintered powder mixture of 80% Si plus 20% B.

B. Bulk density, gm./cc.

C. Percent shrinkage upon sintering.

The mechanisms of the sintering operation on the green formed material in air from room temperature to the elevated temperatures of from 2525 to 2700° F. are quite complex. The primary operative mechanisms are believed to be:

(1) During the heating of the material to between 100° F. and 1800° F. the predominate reaction is the oxidation of boron to boron oxide. The rate of heating, the boron content, and the initial green porosity or density of the material determine the amount of boron oxide formed.

(2) Above 1800° F. silicon oxidizes slightly, but the main reaction that occurs is the reduction of the initially formed boron oxide. The boron oxide is reduced by the silicon to form the boron reaction phase $Si_mB_n$. In addition, the other reaction products, which are $SiO_2$, $SiO$ and $BO$ are soluble in the remaining boron oxide. It is this complex oxide, formed by the reduction of $B_2O_3$, that is referred to herein as the borosilicate phase. The borosilicate phase once formed practically eliminates further penetration of oxygen into the material. Further densification of the material is negligible.

(3) Above 2200° F. the silicon-boron-reaction phase $Si_mB_n$ is also formed by the direct reaction between the elements silicon and boron.

(4) In the temperature range of between 2500 and 2550° F. silicon tends to coalesce, and above 2550° F. silicon melts. The coalescing or the melting of silicon tends to densify the material.

From the above brief explanation of the sintering mechanisms it is evident that the total firing time, the heating rates, and the initial green density of the material will all influence the characteristics of the final product. For example, when a 65 wt. percent Si plus a 35 wt. percent B mixture is heated to 2550° F. in 3 hours, the center portion of the material is porous and soft. The primary reason for the porous center section is that the penetration of oxygen $O_2$ and the formation of $B_2O_3$ is time dependent. Once the borosilicate phase is formed on the outside shell of the material, further penetration and oxidation of the soft material contained in the middle of the sample is prevented. Continued heating of this material at 2550° F. does not densify or oxidize it further.

Increased densities of thick-walled or solid shapes can be obtained by pre-sintering the material following a normal firing schedule. The material may be then pulverized, formed, and resintered. Shapes made in this manner have increased bulk densities and are of uniform density throughout. It has been determined that additions to the pre-sintered material of unreacted Si and B in various proportions also result in a final uniform material with a high bulk density. These additions also provide a convenient method for varying the final Si-B-O content. Illustrative examples of how the proportion of Si-B-O can be varied and greater densities obtained in the final product are as follows:

A raw mixture of 65 wt. percent Si plus 35 wt. percent B is sintered to 2550° F. in air. Oxygen from the air is added during the sintering. This pre-sintered material is pulverized. To this pulverized pre-sintered material is added various proportions of silicon, and boron. The resultant mixtures are formed and sintered. Illustrative mixes are:

(*a*) 100% wt. percent of the above pre-sintered composition.

(*b*) 80 wt. percent of the pre-sintered composition to which is added 7 wt. percent B and 13 wt. percent Si.

(*c*) 50 wt. percent of the pre-sintered composition to which is added 17.5 wt. percent B and 32.5 wt. percent Si.

(*d*) 80 wt. percent of the pre-sintered composition to which is added 20 wt. percent Si.

(*e*) 80 wt. percent of the pre-sintered composition to which is added 20 wt. percent B.

All of these compositions result in dense shapes with approximately the same firing shrinkage.

The oxides $SiO_2$ and $B_2O_3$ may be added in various amounts to the pre-sintered material to vary the amounts and the composition of the borosilicate phase of the final product.

The sintered silicon-boron-oxygen material, when subjected to X-ray diffraction, metallographic, and chemical analysis, indicates the presence of three predominate phases: an amorphous borosilicate matrix phase which has a Vicker's micro hardness of 570 kg./mm.$^2$ and contains from 2 to 8 wt. percent boron in the oxide phase, depending upon the initial composition and the sintering variables, a dispersed unreacted silicon phase which has a micro-hardness of 890 kg./mm.$^2$, and a dispersed silicon-boron reaction phase $Si_mB_n$ which has a micro-hardness of 2230 kg./mm.$^2$. The X-ray diffraction pattern of the $Si_mB_n$ phase contains indeterminate lines that are not associated with any presently known compounds of Si, B, O and N. The $d$ spacings in A. units for the $Si_mB_n$ phase are as follows:

| $d$ spacings in angstroms | intensity | $d$ spacings in angstroms | intensity |
|---|---|---|---|
| 2.76 | S | 1.76 | W |
| 2.69 | S | 1.68 | W |
| 4.17 | M | 2.31 | W |
| 3.17 | M | 2.52 | W |
| 1.61 | M | 2.86 | VW | wherein S is strong, M is medium, W is weak and VW is very weak, as explained on page 414 in the text by Wayne T. Sproull entitled X-rays In Practice, published in 1946 by the McGraw-Hill Publishing Company, New York City.

Electrical resistivity at room temperature of the Si-B-O material that is contemplated hereby is in the range of from 1 to 150 ohm-cm. or higher and is a function of both the composition of the material and of the method of its fabrication. The Si-B-O material acts as a susceptor when placed in a high frequency induction field and heats up to a temperature of 3500° F. within a matter of seconds, which again illustrates its low electrical resistivity.

Oxidation tests of the Si-B-O material have been carried out in air at elevated temperatures up to 3000° F. The material of the weight composition 65% Si and 35% B for example which is sintered in air, exhibits no measurable weight gains when tested at the temperatures 1800° F. and 2550° F. for 24 hours. The same material has a small weight gain when tested at the temperature of 2400° F. for 150 hours. The material is stable in air at temperatures in the order of 3000° F. It is also not attacked by boiling water. This material has the highest boron content of any comparable material that is stable in air at 3000° F. and is insoluble in hot water, thus making it useful for nuclear applications.

Good thermal shock resistance of the Si-B-O material is exhibited when it is heated in an oxygen-gas torch to 3000° F. and is cooled to room temperature in repeated cycles without failure.

The Si-B-O material is corrosion resistant in an environment of $B_2O_3$ and $B_2O_3$-B in the molten state. The following tests of the Si-B-O material used as crucibles and containing $B_2O_3$ and $B_2O_3+B$ mixtures were conducted in air at temperatures up to 2700° F. for 24 hours and one test for 150 hours at 2400° F. There was no visible attack on the container crucibles made of the Si-B-O material disclosed herein. According to this invention the chemical resistance to this highly corrosive melt is regarded as being due to the borosilicate matrix phase present in the Si-B-O refractory material. The remaining dispersed unreacted Si and $Si_mB_n$ act as the refractory components, wherein m and n are the integers from 1 to 6 inclusive.

The Si-B-O refractory material may be applied as a coating on metals and other supports to provide or to impart thereto resistance to oxidation and corrosion, such as when placed in contact with boron-boron oxide at high temperatures. The coatings may be applied by commonly practiced techniques, such as flame spraying and the like, using the unreacted or the presintered Si-B-O refractory material in either powder or in rod form.

The material is useful for nuclear applications in serving as control rods and shielding material, due to its high boron content, its stability in air at high temperatures, its good thermal shock properties and its low density when compared with other materials used for comparable services.

The Si-B-O refractory material may be made into resistor elements of electrical characteristics that may be modified over a usable range by changes in their composition and fabrication techniques. The material has useful applications as formed shapes to provide heating elements in electrical furnaces in an oxidizing atmosphere, because of its low resistivity, thermal shock resistance and resistance to oxidation. Formed hollow shapes serve as susceptors for high frequency induction heating in air.

The described material is useful in the field of missiles due to its high strength to weight ratio, its resistance to oxidation in air and its good thermal shock properties.

It is to be understood that the compositions that are disclosed herein and the method of making the compositions that are disclosed herein have been submitted as being illustrative embodiments of successful reductions to practice of the present invention and that limited modifications in both articles and process that yield comparable results may be substituted therefor without departing from the scope of the present invention.

We claim:

1. A sintered refractory article formed from a raw mix consisting of by weight from 5% to 50% boron and from 50% to 95% silicon, said article consisting of a silicon-boron-oxygen refractory composed of three phases that consist of a boro-silicate matrix phase in which are dispersed an unreacted silicon phase and a silicon-boron reaction phase, which article has an oxygen gain by weight of between 19.6% and 43.8% and the material being characterized by chemical inertness in air to mixtures of boron and boron oxide at temperatures between the melting point of boron oxide and 2700° F.

2. The material defined in claim 1 characterized by its resistance to boiling water at atmospheric pressure and its stability in air at 3000° F.

3. The material as complete article consisting of a silicon-boron-oxygen refractory composed of three phases that consist of a borosilicate matrix phase in which are dispersed an unreacted silicon phase and a silicon-boron reaction phase which article has an oxygen gain by weight of between 19.6% and 43.8% and the material being characterized by having an electrical resistivity at room temperature of between 1 and 100 ohm-centimeters.

4. The process for the production of boron-silicon-oxygen refractory shapes that have a density of from 1.8 to 2.3 grams per cubic centimeter by the steps of mixing by weight from 5 to 50% boron with from 95 to 50% silicon of a size to pass a screen of 150 mesh, adding to the mix from ½ to 1 cc. of 1 N HCl for each gram of the dry powder mixture to form a slurry, pouring the slurry into a plaster of Paris mold, pouring the excess slurry out of the mold after a desired specimen wall thickness has built up in the mold cavity, removing the green specimen from the mold, drying the green specimen to remove the moisture content, sintering the dried green specimen at about a temperature range of from 2525 to 2700° F. in air with the total sintering time of from 1 to 6 hours with an accompanying weight gain of oxygen within the range of from 19.6 to 43.8 percent, and cooling the sintered specimen to room temperature.

5. The process for the production of boron-silicon-oxygen refractory shapes that have a density of from 1.8 to 2.3 grams per cubic centimeter by the steps of mixing powders by weight from 5 to 50% boron with from 95 to 50% silicon of a size to pass a screen of 150 mesh, pressing the mixed powders into green specimen shapes, sintering the green specimen shapes up to temperatures of from 2525 to 2700° F. in air with a total firing time of from 1 to 6 hours with an accompanying weight gain of oxygen within the range of from 19.6 to 43.8 percent, and cooling the sintered specimens to room temperature.

6. The process for obtaining dense and solid shapes of boron-silicon-oxygen refractory material by mixing boron and silicon, sintering in air the mixture consisting of by weight from 5 to 50 percent boron and from 95 to 50 percent silicon which during sintering undergoes a weight gain of oxygen in the range of between 19.6 and 43.8 percent, powdering the sintered mixture, enriching the mixture of a range by weight of from 50% to 95% silicon and from 5% to 50% boron by adding to the powdered sintered mixture a selection from the group material selected from the group consisting of boron and silicon, forming the enriched mixture into a green specimen, resintering the formed green specimen, and cooling the resintered specimen to room temperature.

7. A sintered refractory formed from a raw mix consisting of by weight from 5% to 50% boron and from 50% to 95% silicon, said article consisting of a silicon-boron-oxygen refractory composed of three phases that consist of a borosilicate matrix phase in which are dispersed an unreacted silicon phase and a silicon-boron reaction phase, which article has an oxygen gain by weight of from between 19.6% and 43.8% and the material being characterized by chemical inertness in air to mixtures of boron and boron oxide at temperatures between the melting point of boron oxide and 2700° F.

8. The process of making a silicon-boron-oxygen refractory material that consists of the three phases of a borosilicate matrix phase in which are dispersed an unreacted silicon phase and a silicon-boron reaction phase by making a raw mixture of by weight 65 percent silicon and 35 percent boron, presintering the mixture in air at the temperature 2550° F. during which oxygen from the air is added to the silicon and boron with a weight gain in the range of from 19.6 to 41.7 percent oxygen to provide a pre-sintered material, pulverizing the pre-sintered material, forming the pre-sintered material into an object, and sintering the object into a final product.

9. The process for obtaining dense and solid shapes of boron-silicon-oxygen refractory material by mixing by weight from 5% to 50% boron with from 95% to 50% silicon, sintering in air the mixture of boron and silicon which mixture during sintering undergoes a weight gain of oxygen in the range of between 19.6% and 43.8%, powdering the sintered mixture, enriching the sintered mixture by adding to 80 weight percent of the sintered mixture 7 weight percent of boron and 13 weight percent of silicon, forming the boron and silicon enriched mixture into a green specimen, resintering the formed green specimen, and cooling the resintered specimen to room temperature.

10. The process for obtaining dense and solid shapes of boron-silicon-oxygen refractory material by mixing by weight from 5% to 50% boron with 95% to 50% silicon, sintering in air the mixture of boron and silicon which mixture during sintering undergoes a weight gain of oxygen in the range of between 19.6% and 43.8%, powdering the sintered mixture, enriching the sintered mixture by adding to 50 weight percent of the presintered mixture 17.5 weight percent boron and 32.5 weight percent silicon to make an enriched mixture, forming the boron and silicon enriched mixture into a green specimen, resintering the formed green specimen, and cooling the resintered specimen to room temperature.

11. The process for obtaining dense and solid shapes of boron-silicon-oxygen refractory material by mixing by weight from 5% to 50% boron with from 95% to 50% silicon, sintering in air the mixture of boron and silicon which mixture during sintering undergoes a weight gain of oxygen in the range of between 19.6% and 43.8%, powdering the sintered mixture, enriching the sintered mixture by adding to 80 weight percent of the presintered mixture 20 weight percent silicon to make a silicon enriched mixture, forming the silicon enriched mixture into a green specimen, resintering the formed green specimen, and cooling the resintered specimen to room temperature.

12. The process for obtaining dense and solid shapes of boron-silicon-oxygen refractory material by mixing by weight from 5% to 50% boron with from 95% to 50% silicon, sintering in air the mixture of boron and silicon which mixture during sintering undergoes a weight gain of oxygen in the range of between 19.6% and 43.8%, powdering the sintered mixture, enriching the sintered mixture by adding to 80 weight percent of the presintered mixture 20 weight percent boron to make a boron enriched mixture, forming the boron-enriched mixture into a green specimen, resintering the formed green specimen, and cooling the resintered specimen to room temperature.

13. The process for obtaining dense and solid shapes of boron-silicon-oxygen refractory material by mixing by weight 65% silicon with 35% boron, sintering in air the mixture of boron and silicon at 2550° F. and which mixture during sintering undergoes a weight gain of oxygen in the range of between 19.6% and 43.8%, pulverizing the sintered mixture, forming the pulverized and sintered mixture into a green specimen, resintering the formed green specimen, and cooling the resintered specimen to room temperature.

References Cited in the file of this patent

UNITED STATES PATENTS

| | | |
|---|---|---|
| 1,913,373 | De Golyer | June 13, 1933 |
| 2,747,260 | Carlton et al. | May 29, 1956 |

UNITED STATES PATENT OFFICE

CERTIFICATE OF CORRECTION

Patent No. 3,096,187                                     July 2, 1963

Berthold C. Weber et al.

It is hereby certified that error appears in the above numbered patent requiring correction and that the said Letters Patent should read as corrected below.

Column 1, line 12, for "use" read -- used --; column 2, line 47, after "shapes" insert -- from --; column 3, line 58, after "weight" strike out the comma.

Signed and sealed this 30th day of June 1964.

(SEAL)
Attest:

ERNEST W. SWIDER
Attesting Officer

EDWARD J. BRENNER
Commissioner of Patents